(12) United States Patent
Jeong et al.

(10) Patent No.: US 12,097,742 B2
(45) Date of Patent: Sep. 24, 2024

(54) VEHICLE SUSPENSION ARM

(71) Applicant: ILJIN CO., LTD., Gyeongju-si (KR)

(72) Inventors: Se Woong Jeong, Ulsan (KR); Ig Jin Kwon, Daegu (KR); Seong Soon Hwang, Seoul (KR); Hyun Tae Bang, Incheon (KR); Ki Ho Kim, Cheongju-si (KR); Hwan Soo Song, Seoul (KR)

(73) Assignee: ILJIN Co., Ltd., Gyeongju-si (KR)

( * ) Notice: Subject to any disclaimer, the term of this patent is extended or adjusted under 35 U.S.C. 154(b) by 0 days.

(21) Appl. No.: 17/789,370

(22) PCT Filed: Dec. 28, 2020

(86) PCT No.: PCT/KR2020/019237
§ 371 (c)(1),
(2) Date: Jun. 27, 2022

(87) PCT Pub. No.: WO2021/133146
PCT Pub. Date: Jul. 1, 2021

(65) Prior Publication Data
US 2023/0128477 A1    Apr. 27, 2023

(30) Foreign Application Priority Data

Dec. 27, 2019 (KR) .......................... 10-2019-0177179

(51) Int. Cl.
*B60G 7/00* (2006.01)

(52) U.S. Cl.
CPC ........ *B60G 7/001* (2013.01); *B60G 2206/017* (2013.01); *B60G 2206/10* (2013.01);
(Continued)

(58) Field of Classification Search
CPC .... B60G 2206/8206; B60G 2206/8207; B60G 7/001; B60G 2206/10; B60G 2206/7101;
(Continued)

(56) References Cited

U.S. PATENT DOCUMENTS 2,167,984 A * 8/1939 Leighton ............. F16C 11/0604
    403/126
3,672,698 A * 6/1972 Froumajou .............. B60G 3/14
    280/124.153
(Continued)

FOREIGN PATENT DOCUMENTS

JP    H07119729 A    5/1995
JP    H11217014 A    8/1999
(Continued)

*Primary Examiner* — Timothy Wilhelm
(74) *Attorney, Agent, or Firm* — Dinsmore & Shohl LLP; Yongsok Choi, Esq.

(57) ABSTRACT

There is provided a suspension arm for a vehicle used in a suspension device of a vehicle. The suspension arm may include: a body portion constituting a basic body of the suspension arm; and a plurality of mounting portions configured to connect the suspension arm to a wheel-side member or a vehicle-body-side member. At least one of the plurality of mounting portions may be configured to include a bushing coupling portion and a fastening portion formed to extend from the bushing coupling portion to one side, such that the fastening portion may be coupled to a coupling portion provided on one side of the body portion in surface-contact with state.

9 Claims, 6 Drawing Sheets (52) U.S. Cl.
CPC .............. *B60G 2206/7101* (2013.01); *B60G 2206/7102* (2013.01); *B60G 2206/82* (2013.01)

(58) Field of Classification Search
CPC ...... B60G 2206/7102; B60G 2206/017; B60G 2206/122; B60G 2206/81; B60G 2206/8106; B60G 2206/82; B60G 7/005; B60G 2206/81012; B60Y 2304/03
See application file for complete search history.

(56) References Cited

U.S. PATENT DOCUMENTS

| | | | | |
|---|---|---|---|---|
| 4,046,402 | A * | 9/1977 | Allison | B60G 7/001 267/276 |
| 5,478,103 | A * | 12/1995 | Maeda | B60G 7/001 280/124.152 |
| 5,607,177 | A * | 3/1997 | Kato | B60G 7/001 280/124.134 |
| 5,639,110 | A * | 6/1997 | Pierce | B60G 9/003 280/124.11 |
| 5,695,213 | A * | 12/1997 | Nakamura | B60G 7/001 280/124.134 |
| 5,876,148 | A * | 3/1999 | Kraps | F16C 7/00 403/56 |
| 5,954,353 | A * | 9/1999 | Kincaid | F16C 7/02 280/124.152 |
| 6,047,978 | A * | 4/2000 | Watanabe | B60G 7/001 267/273 |
| 6,076,247 | A * | 6/2000 | Durand | B62D 27/02 29/515 |
| 6,076,840 | A * | 6/2000 | Kincaid | B60G 21/0551 267/188 |
| 6,095,712 | A * | 8/2000 | Ridley | B62D 7/16 188/264 G |
| 6,224,075 | B1 * | 5/2001 | McIntyre | B62D 17/00 280/86.756 |
| 6,273,406 | B1 * | 8/2001 | Miyamoto | B60G 7/02 267/140.12 |
| 6,371,500 | B1 * | 4/2002 | Goddard | B60G 3/205 280/86.756 |
| 6,513,818 | B1 * | 2/2003 | Seuser | B60G 7/001 280/124.125 |
| 6,843,492 | B2 * | 1/2005 | Inoue | B60G 7/001 280/124.135 |
| 7,163,219 | B2 * | 1/2007 | Seksaria | B60G 7/001 280/124.133 |
| 7,207,600 | B2 * | 4/2007 | Beckmann | B60G 15/14 180/311 |
| 7,690,661 | B2 * | 4/2010 | Tsuruta | B60G 21/055 180/908 |
| 7,703,782 | B2 * | 4/2010 | Kiselis | B60G 7/001 280/124.133 |
| 7,748,491 | B2 * | 7/2010 | Seki | B60K 17/24 74/606 R |
| 7,748,727 | B2 * | 7/2010 | Murayama | B60G 21/0551 280/124.152 |
| 7,762,570 | B2 * | 7/2010 | Mihelič | B62K 15/006 403/325 |
| 7,770,907 | B2 * | 8/2010 | Shimizu | B60G 3/20 280/124.135 |
| 7,934,735 | B2 * | 5/2011 | Kuwabara | B60G 7/001 280/124.135 |
| 7,938,417 | B2 * | 5/2011 | Ersoy | B60G 7/005 280/124.134 |
| 7,980,576 | B2 * | 7/2011 | Inoue | B60G 7/001 280/124.121 |
| 8,414,002 | B2 * | 4/2013 | Yu | B60G 7/001 280/124.134 |
| 8,424,891 | B2 * | 4/2013 | Nagai | F16F 1/3821 280/124.107 |
| 8,444,162 | B2 * | 5/2013 | Fruhmann | B60G 11/10 267/7 |
| 8,459,674 | B2 * | 6/2013 | Mielke | B60G 7/001 280/124.134 |
| 8,496,258 | B2 * | 7/2013 | Werner | B60G 7/001 280/124.128 |
| 8,899,602 | B2 * | 12/2014 | Takanashi | B60G 99/00 280/124.135 |
| 9,097,339 | B2 * | 8/2015 | Skogward | F16H 63/32 |
| 9,278,595 | B2 * | 3/2016 | Ohta | B60G 7/02 |
| 9,346,492 | B2 * | 5/2016 | Oshima | B60G 7/001 |
| 9,505,283 | B2 * | 11/2016 | Kuwabara | B60G 7/001 |
| 9,925,838 | B2 * | 3/2018 | Karpman | B60G 7/005 |
| 10,081,044 | B2 * | 9/2018 | Haselhorst | B60G 7/001 |
| 10,118,452 | B2 * | 11/2018 | Drotar | B60G 7/008 |
| 10,160,275 | B2 * | 12/2018 | Meier | B60G 7/001 |
| 10,202,013 | B2 * | 2/2019 | Steiner | B60G 7/001 |
| 10,427,482 | B2 * | 10/2019 | Compigne | B60G 7/001 |
| 10,450,005 | B2 * | 10/2019 | Weifenbach | B62D 17/00 |
| 10,500,914 | B2 * | 12/2019 | Buerger | B60G 3/20 |
| 10,549,592 | B2 * | 2/2020 | Meyer | B29C 45/14336 |
| 10,814,535 | B2 * | 10/2020 | Lee | B29C 45/14344 |
| 11,124,032 | B2 * | 9/2021 | Paulsen | B21C 23/002 |
| 11,135,885 | B2 * | 10/2021 | Meyer | B60G 3/225 |
| 11,203,240 | B2 * | 12/2021 | Bowden, Jr. | B60G 7/001 |
| 11,541,710 | B2 * | 1/2023 | Hoschouer | B60G 7/005 |
| 11,697,320 | B2 * | 7/2023 | Dítě | B60G 7/001 280/124.116 |
| 11,738,614 | B2 * | 8/2023 | Musci | B60G 7/001 280/124.134 |
| 2001/0028156 | A1 * | 10/2001 | Handa | B60G 3/20 280/124.135 |
| 2004/0135337 | A1 * | 7/2004 | Alesso | B60G 7/001 280/124.134 |
| 2005/0221936 | A1 * | 10/2005 | Seki | B60G 21/0551 474/144 |
| 2006/0151970 | A1 * | 7/2006 | Kaminski | B60G 3/06 264/46.7 |
| 2008/0179853 | A1 * | 7/2008 | Kuwabara | B60G 7/001 280/124.134 |
| 2009/0102153 | A1 * | 4/2009 | Jung | B60G 7/001 280/124.15 |
| 2009/0160151 | A1 * | 6/2009 | Gaumer | F16C 11/0614 280/124.1 |
| 2011/0285102 | A1 * | 11/2011 | Yu | B60G 7/001 280/124.134 |
| 2011/0298192 | A1 * | 12/2011 | Yu | B60G 7/001 280/124.134 |
| 2012/0021241 | A1 * | 1/2012 | Perry | B60G 3/06 29/428 |
| 2012/0098228 | A1 * | 4/2012 | Wilson | B60G 7/005 280/124.134 |
| 2013/0205591 | A1 * | 8/2013 | Santini | B60G 7/001 29/897.2 |
| 2015/0061274 | A1 * | 3/2015 | Oshima | B60G 13/003 280/788 |
| 2015/0183286 | A1 * | 7/2015 | Bruehl | B62D 7/18 280/124.135 |
| 2016/0121679 | A1 * | 5/2016 | Meier | B21D 53/88 228/101 |
| 2018/0326803 | A1 * | 11/2018 | Meyer | B60G 7/001 |
| 2019/0152283 | A1 * | 5/2019 | Kwon | F16C 11/0657 |
| 2020/0108681 | A1 * | 4/2020 | Matsumoto | B60G 7/008 |
| 2022/0144031 | A1 * | 5/2022 | Piva | B60G 7/001 |
| 2022/0194160 | A1 * | 6/2022 | Besting | B60G 21/0551 |
| 2023/0044414 | A1 * | 2/2023 | Schmidt | B60G 21/0551 |
| 2023/0131048 | A1 * | 4/2023 | Jeong | B29C 70/42 72/352 |

FOREIGN PATENT DOCUMENTS

| | | | |
|---|---|---|---|
| JP | 2006138256 A | 6/2006 | |
| KR | 100822544 B1 | 4/2008 | |
| WO | WO-2017080746 A1 * | 5/2017 | ............ B29C 65/48 |

* cited by examiner

VEHICLE SUSPENSION ARM

CROSS-REFERENCE TO RELATED APPLICATIONS

This application is a national phase of International Application No. PCT/KR2019/018751 filed on Dec. 30, 2019, which claims priority to Korean Patent Application No. 10-2019-0177177 filed on Dec. 27, 2019, the entire contents of which are herein incorporated by reference.

TECHNICAL FIELD

The present disclosure relates to a suspension arm constituting a suspension device of a vehicle, and more particularly to a suspension arm for a vehicle in which weight reduction is achieved and sufficient rigidity is ensured by improving a structure between a body portion and mounting portions.

The present disclosure has been derived from a study conducted as Carbon Industry Foundation Development Project of Korea Evaluation Institute of Industrial Technology of Ministry of Trade, Industry and Energy [Project Number: 10083624, Research Subject Name: Development of suspension module for a vehicle using rapid curing carbon composite material high speed molding technology]

BACKGROUND ART

A suspension device of a vehicle is a device for connecting a wheel to a vehicle body, and includes a spring for absorbing vibration or impact transferred from a road surface to the vehicle body, a shock absorber for controlling the operation of the spring, a suspension arm or a suspension link for controlling the operation of the wheel, and the like.

Among these, the suspension arm is configured such that one side thereof is connected to a wheel-side member via a ball coupling and another side thereof is connected to a vehicle-side member such as a cross member, a sub-frame or the like. The suspension arm supports the wheel on the vehicle body and properly controls a toe—in of the wheel according to a driving situation of the vehicle, thereby improving straight driving drivability and steering stability of the vehicle.

Typically, such a suspension arm for a vehicle has been formed by casting or press-machining a metal-based material to ensure the rigidity required for the suspension arm. However, in recent years, various studies have been conducted to improve a material and structure of the suspension arm with increased demands for a lightweight of components for a vehicle.

As an example, Patent Document 1 discloses a technique for manufacturing a suspension arm for a vehicle using carbon fiber reinforced plastic (CFRP) material.

Figure 1:
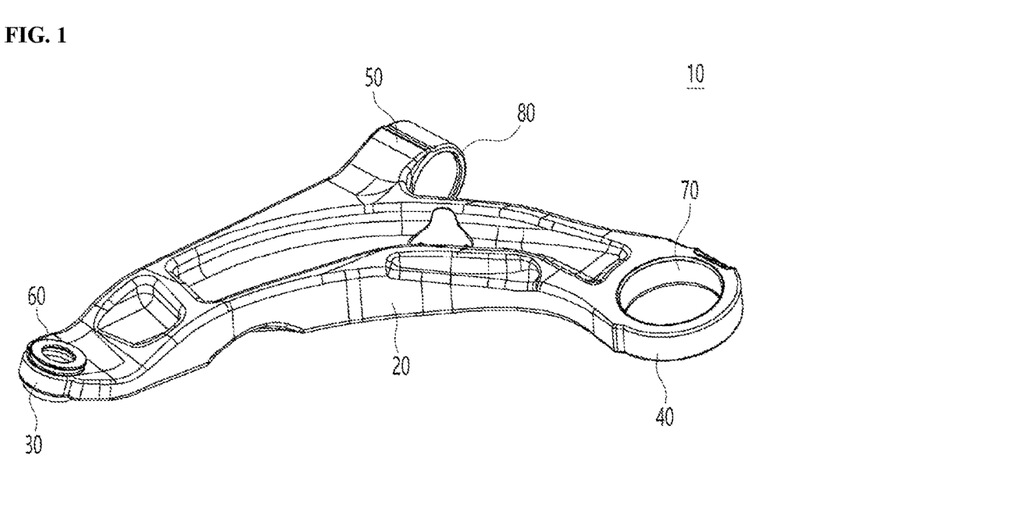
FIG. 1 exemplarily illustrates an example of a suspension arm for a vehicle known in the related art.

For example, as illustrated in FIG. 1, a suspension arm 10 for a vehicle disclosed in Patent Document 1 is formed in a structure in which mounting portions (for example, a wheel-side mounting portion 30 on which a B-bushing 60 is mounted, a vehicle-body-side mounting portion 40 on which a G-bushing 70 is mounted, and a vehicle-body-side mounting portion 50 on which an A-bushing 80 is mounted) used for connecting a suspension arm to a wheel-side member or a vehicle-body-side member are provided on one side of a body portion 20 constituting a main frame. The suspension arm 10 is formed by filling a metal mold with a carbon fiber reinforced plastic material such as a carbon chip, and then performing a hot-pressing on the material.

Incidentally, in the suspension arm 10, a relatively high load may be applied to the vicinity of the mounting portions 30, 40, and 50 in which the suspension arm is connected to the wheel-side member or the vehicle-body-side member, compared with other portions. As a result, the mounting portions 30, 40 and 50 may be prone to be damaged.

In particular, in the case in which the suspension arm is formed using the carbon fiber reinforced plastic material or the like as in Patent Document 1, damage such as a crack or warping may be likely to occur in the vicinity of the mounting portions 30, 40 and 50 where the load is concentrated due to anisotropic characteristics of the carbon fiber reinforced plastic material exhibiting weak rigidity against force in any one direction.

[Document in Related Art]
Patent Document 1: Korean Patent Application Publication No. 10-2019-0030010 (Publication Date: Mar. 21, 2019)

SUMMARY

Technical Problem

The present disclosure was made in view of the above-described matters in the related art, and the present disclosure is for the purpose of providing a suspension arm for a vehicle configured to reduce a weight thereof and ensure sufficient rigidity by improving a structure between a body portion and mounting portions.

Technical Solution

Representative configurations of the present disclosure for achieving the above aspects are described below.

According to an aspect of the present disclosure, there is provided a suspension arm for a vehicle used in a suspension device of a vehicle. The suspension arm according to an aspect of the present disclosure may include: a body portion constituting a basic body of the suspension arm; and a plurality of mounting portions configured to connect the suspension arm to a wheel-side member or a vehicle-body-side member. According to an aspect of the present disclosure, at least one of the plurality of mounting portions may be configured to include a bushing coupling portion and a fastening portion formed to extend from the bushing coupling portion to one side, such that the fastening portion may be coupled to a coupling portion provided on one side of the body portion in surface-contact with state.

According to an aspect of the present disclosure, the fastening portion may include one or more coupling plates, and the one or more coupling plates may be configured to be coupled to the coupling portion of the body portion in surface-contact state.

According to an aspect of the present disclosure, the one or more coupling plates may include an upper plate and a lower plate disposed to be spaced apart from each other, and the coupling portion of the body portion may be configured to be inserted and coupled between the upper plate and the lower plate.

According to an aspect of the present disclosure, the coupling portion of the body portion may be configured to slidably move in one direction such that the coupling portion of the body portion is inserted and coupled between the upper plate and the lower plate of the fastening portion.

According to an aspect of the present disclosure, a slip prevention portion configured to prevent a slip of the fastening portion relative to the coupling portion may be provided between the fastening portion and the coupling portion.

According to an aspect of the present disclosure, the slip prevention portion may include a protrusion portion formed to extend along a sliding movement direction between the coupling portion and the fastening portion, and a recess in which the protrusion portion is accommodated.

According to an aspect of the present disclosure, the slip prevention portion may include: a first slip prevention portion provided with an upper protrusion portion formed to protrude upward from an upper surface of the connecting portion, and an upper recess formed in a lower surface of the upper plate and formed to be depressed into a shape corresponding to the upper protrusion portion; and a second slip prevention portion provided with a lower protrusion portion formed to protrude upward from an upper face of the lower plate, and a lower recess formed in a lower face of the coupling portion and formed to be depressed into a shape corresponding to the lower protrusion portion.

According to an aspect of the present disclosure, the first slip prevention portion and the second slip prevention portion may be configured to be positioned to overlap with each other in a direction perpendicular to the coupling plate of the fastening portion.

According to an aspect of the present disclosure, the suspension arm may further comprise at least one fastening member formed to penetrate and be inserted into the fastening portion and the coupling portion.

According to an aspect of the present disclosure, the fastening member may be configured with a locking pin that is inserted in the direction perpendicular to the coupling plate of the fastening portion.

According to an aspect of the present disclosure, the locking pin may be a spring-pin.

According to an aspect of the present disclosure, the body portion may be formed of a first material, the plurality of mounting portions including the bushing coupling portion and the fastening portion may be formed of a second material, and the first material and the second material may be different from each other.

According to an aspect of the present disclosure, the first material may be a carbon-based material, and the second material may be a metallic material.

According to an aspect of the present disclosure, the first material may be a carbon fiber reinforced plastic, and the second material may be aluminum.

Further, the suspension arm for a vehicle according to the present disclosure may further include other additional configurations without departing from the technical sprit of the present disclosure.

Advantageous Effects

A suspension arm for a vehicle according to an example embodiment of the present disclosure is configured such that at least one mounting portion used to connect the suspension arm to a wheel-side member or a vehicle-body-side member is formed separately from a body portion of the suspension arm for a vehicle, and then coupled to the body portion of the suspension arm in surface-contact state. This makes it possible to provide more improved rigidity to the mounting portion of the suspension arm for a vehicle, to which a relatively high load is applied.

Further, the suspension arm for a vehicle according to an example embodiment of the present disclosure is configured such that the above mounting portion is slidably moved to the body portion and coupled to the body portion, and a slip prevention portion (for example, a protrusion portion and a recess structure formed to extend in a sliding movement direction) for preventing a slip in a direction intersecting with the sliding movement direction is provided between the mounting portion and the body portion. This makes it possible to prevent matters that a slip occurs between the mounting portion and the body portion, and hence the rigidity of the suspension arm is lowered or the suspension arm is broken.

Further, the suspension arm for a vehicle according to an example embodiment of the present disclosure is configured such that a locking pin is inserted into and coupled to a coupling portion between the mounting portion and the body portion described above. This makes it possible to stably maintain a coupling state between the mounting portion and the body portion, which are separately formed, by the locking pin.

In addition, in the suspension arm for a vehicle according to an example embodiment of the present disclosure, even if the body portion of the suspension arm for a vehicle is formed of a light-weight material such as a carbon fiber reinforced plastic, it is possible to ensure a structural stability required for the suspension arm for a vehicle, due to the improved structure as described above. This makes it possible to lighten a weight of the suspension arm for a vehicle.

EXPLANATION OF REFERENCE NUMERALS

100: Suspension arm for vehicle
200: Body portion
210: Coupling portion

220: Slip prevention portion (formed in the coupling portion of the body portion)
222: Upper protrusion portion
224: Lower recess
230: Through-hole
240: Through-hole (formed in the body portion)
310: First mounting portion
320: Second mounting portion
330: Third mounting portion
340: Bushing coupling portion
350: Fastening portion
360: Upper plate
370: Lower plate
380: Slip prevention portion
382: Upper recess
384: Lower protrusion portion
390: Fastening hole
400: Fastening member (for example, locking pin)

DETAILED DESCRIPTION

Hereinafter, example embodiments of the present disclosure will be described in detail with reference to the accompanying drawings at such an extent that they may be readily practiced by those ordinary skilled in the art.

In order to clearly describe the present disclosure, descriptions of parts irrelevant to the present disclosure will be omitted, and the same/similar reference numerals will be given to the same/similar constituent elements throughout the specification. Further, a size, thickness and position of each constituent element illustrated in the figures are arbitrarily illustrated for the sake of convenience in description, and hence the present disclosure is not necessarily limited to those illustrated. That is, it is to be understood that specific shapes, structures, and characteristics described herein may be modified from an example embodiment to another embodiment without departing from the spirit and scope of the present disclosure. Positions or arrangements of individual constituent elements may also be modified without departing from the spirit and scope of the present disclosure. Therefore, the detailed description described below is not to be taken in a limiting sense, and the scope of the present disclosure is to be taken as covering the scope claimed by the appended claims and their equivalents.

Suspension arm for vehicle according to an example embodiment of the Present Disclosure Referring to FIGS. 2 to 9, there are exemplarily illustrated a suspension arm for a vehicle 100 according to an example embodiment of the present disclosure. The suspension arm for a vehicle 100 according to an example embodiment of the present disclosure is configured such that one side thereof is connected to a wheel-side member and the other side thereof is connected to a vehicle-body-side member as in a suspension arm for a vehicle in the related art so as to perform a function of connecting a wheel of a vehicle to a vehicle body and controlling a motion of the vehicle. Further, as will be described later, the suspension arm for a vehicle 100 according to an example embodiment of the present disclosure is configured to be able to stably ensure rigidity thereof even in a case in which the body portion of the suspension arm is formed with a light-weight material such as a carbon fiber reinforced plastic material or the like, by improving a structure between a body portion and a mounting portion.

Figure 2:
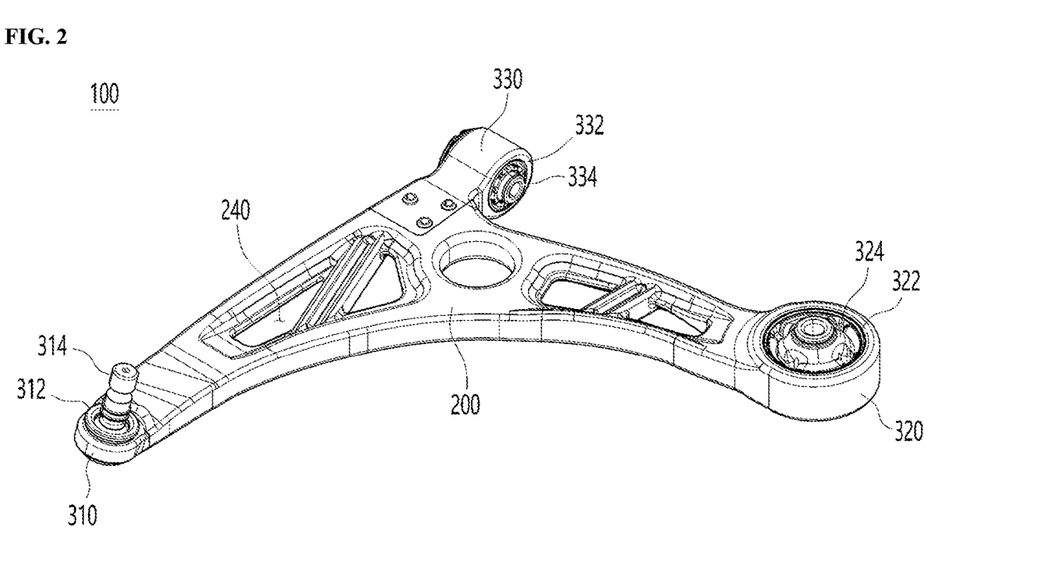
FIG. 2 exemplarily illustrates an overall structure of a suspension arm for a vehicle according to an example embodiment of the present disclosure.
Figure 3:
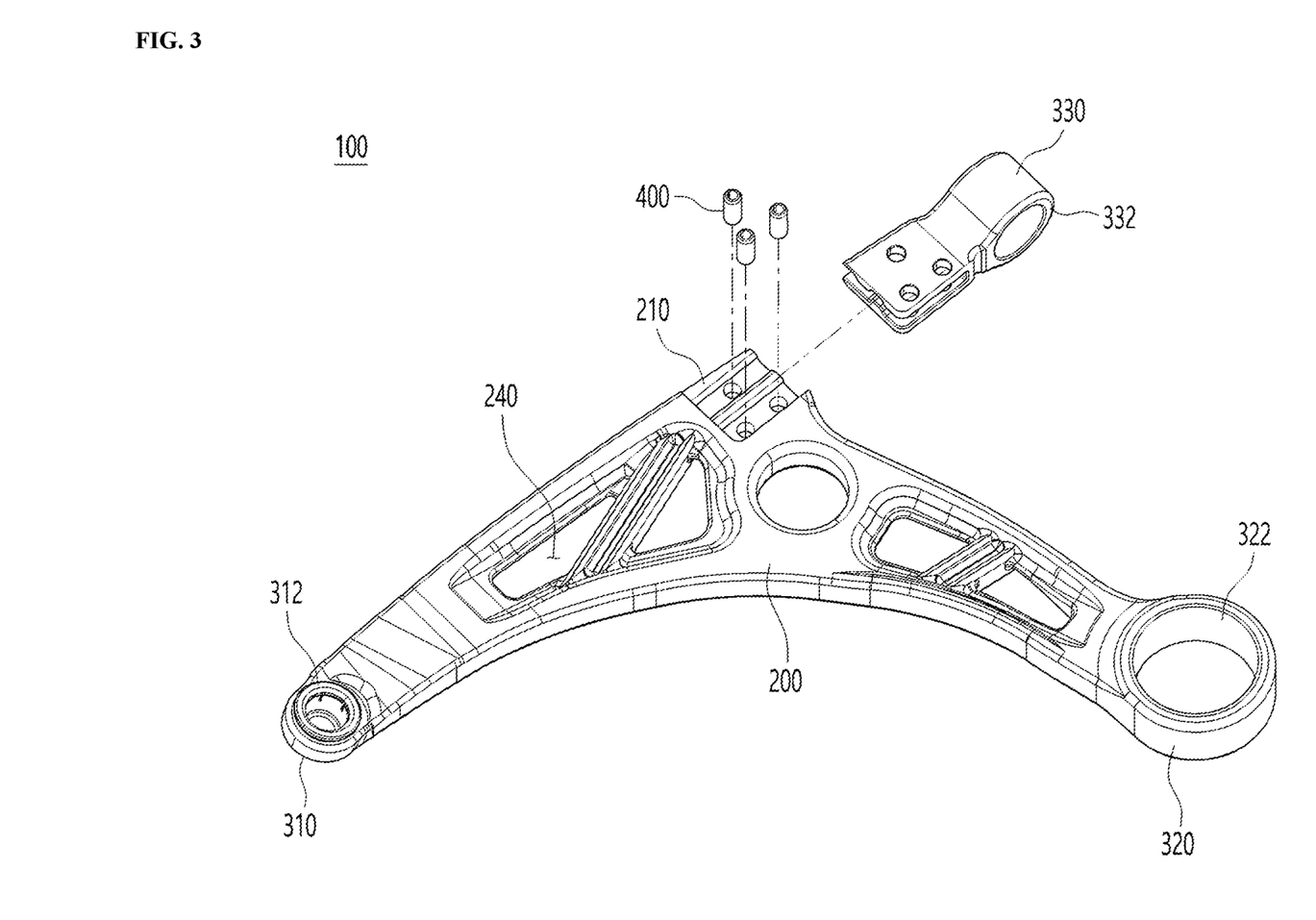
FIG. 3 exemplarily illustrates an exploded perspective view of the suspension arm for a vehicle according to an example embodiment of the present disclosure.

According to an example embodiment of the present disclosure, the suspension arm for a vehicle 100 may be configured to include a body portion 200 located in a central portion thereof, and mounting portions provided on one side of the body portion 200 (for example, a first mounting portion 310 connected to the wheel-side member, a second mounting portion 320 and a third mounting portion 330 connected to the vehicle-body-side member), as illustrated in FIGS. 2 and 3.

According to an example embodiment of the present disclosure, the body portion 200 is a portion that constitutes a basic body of the suspension arm for a vehicle 100 according to an example embodiment of the present disclosure. When the suspension arm for a vehicle 100 according to an example embodiment of the present disclosure is configured as a lower arm, the body portion 200 may be formed in a substantially L-shaped structure including two leg portions each of which extends to one side, as illustrated in FIGS. 2 and 3.

According to an example embodiment of the present disclosure, mounting portions (one or more wheel-side mounting portions and one or more vehicle-body-side mounting portions) used to connect the suspension arm for a vehicle 100 according to an example embodiment of the present disclosure to the wheel-side member or the vehicle-body-side member may be provided in one side of the body portion 200. For example, as illustrated in FIGS. 2 and 3, the mounting portions may be provided at end portions of the two leg portions constituting the body portion 200, a connection portion connecting the two leg portions, and the like.

According to an example embodiment of the present disclosure, an end portion of one of the two leg portions constituting the body portion 200 may be provided with a wheel-side mounting portion (the first mounting portion 310) used to connect the suspension arm to the wheel-side member. According to an example embodiment of the present disclosure, the first mounting portion 310 may be configured such that a B-point bushing 312 is mounted thereon. A ball joint 314 may be inserted into the B-bushing 312 mounted on the first mounting portion 310 to connect the suspension arm to the wheel-side member such as a knuckle (not illustrated).

According to an example embodiment of the present disclosure, an end portion of the other of the two leg portions constituting the body portion 200 and a connection portion between the two leg portions may be provided with vehicle-body-side mounting portions (for example, the second mounting portion 320 on which a G-bushing is mounted and the third mounting portion 330 on which a A-bushing is mounted) used to connect the suspension arm to the vehicle-body-side member. The suspension arm for a vehicle 100 according to an example embodiment of the present disclosure may be configured to be connected to the vehicle-body-side member such as a cross member, a sub-frame or the like through the vehicle-body-side mounting portions (the second mounting portion 320 and the third mounting portion 330).

According to an example embodiment of the present disclosure, the second mounting portion 320 may have a through-hole formed to penetrate the second mounting portion 320 in a direction that is approximately perpendicular to the body portion 200, and the G-bushing 322 may be inserted into and coupled to the through-hole. A G-bushing assembly 324 may be configured to be inserted into and coupled to the G-bushing 322. Through the G-bushing assembly 324, the suspension arm for a vehicle 100 according to an example embodiment of the present disclosure may be connected to the vehicle body while rotating around an axis along a substantially up-down direction of the vehicle.

According to an example embodiment of the present disclosure, the third mounting portion 330 may have a through-hole formed to penetrate the third mounting portion 330 in a direction approximately perpendicular to the G-bushing 322 of the second mounting portion 320, and the A-bushing 332 may be inserted into and coupled to the through-hole. An A-bushing assembly 334 may be inserted into and coupled to the A-bushing 332. Through the A-bushing assembly 334, the suspension arm for a vehicle 100 according to an example embodiment of the present disclosure may be connected to the vehicle body while rotating around an axis along a substantially front-back direction of the vehicle.

The structures of the mounting portions (the first mounting portion 310, the second mounting portion 320 and the third mounting portion 330) and the bushings (the B-bushing 312, the G-bushing 322, and the A-bushing 332) coupled to the respective mounting portions in the suspension arm for a vehicle 100 according to an example embodiment of the present disclosure may be implemented substantially identically or similarly to a suspension arm for a vehicle in the related art, and thus a more specific description thereof will be omitted herein.

Further, detailed structures of the body portion 200 and the mounting portions 310, 320 and 330 of the suspension arm for a vehicle 100 according to an example embodiment of the present disclosure are not limited to those illustrated in the figures but may be changed into other various structures as long as they may be applied to a suspension arm for a vehicle. According to another example embodiment of the present disclosure, the suspension arm for a vehicle 100 may be configured as an upper arm instead of the lower arm illustrated in the figures.

According to an example embodiment of the present disclosure, one or more of the mounting portions 310, 320 and 330 provided in the suspension arm for a vehicle 100 may be formed separately from the body portion 200 and then coupled to the body portion 200.

For example, in FIGS. 2 to 8, an example embodiment is exemplarily illustrated in which the first mounting portion 310 and the second mounting portion 320 may be formed integrally with the body portion 200 in a process of hot-pressing a carbon-based material such as a carbon fiber reinforced plastic (CFRP) to form the body portion 200 as will be described later, and the third mounting portion 330 may be formed separately from the body portion 200 using a metallic material such as aluminum and then coupled to a coupling portion 210 formed on one side of the body portion 200.

Hereinafter, the suspension arm for a vehicle 100 according to an example embodiment of the present disclosure will be described with the above-described example embodiment (in which the third mounting portion 330 is formed separately from the body portion 200 and then coupled to the body portion 200, and the first mounting portion 310 and the second mounting portion 320 are formed integrally with the body portion 200).

Figure 4:
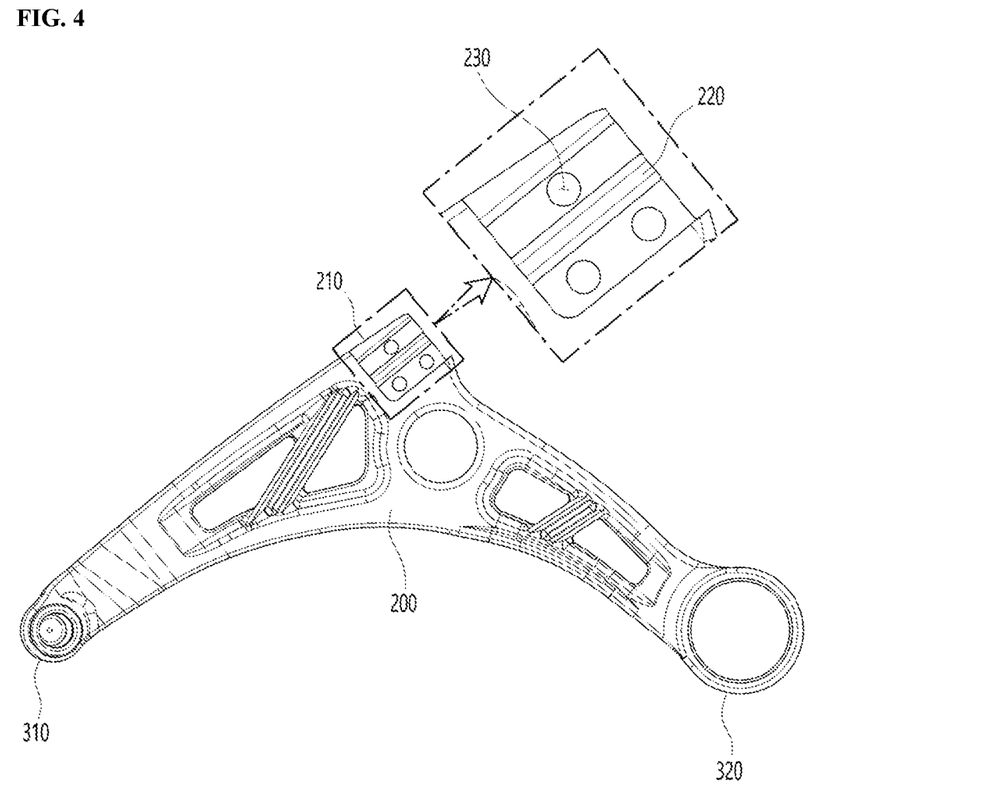
FIG. 4 exemplarily illustrates a body portion of the suspension for the vehicle according to an example embodiment of the present disclosure.

According to an example embodiment of the present disclosure, as illustrated in FIGS. 3 and 4, the body portion 200 may be provided with the coupling portion 210 formed on one side thereof and in which a mounting portion (the third mounting portion 330 in the case of the example embodiment illustrated in the figures) is coupled. One or more through-holes 240 may be formed in a central portion of the body portion 200.

Figure 6:
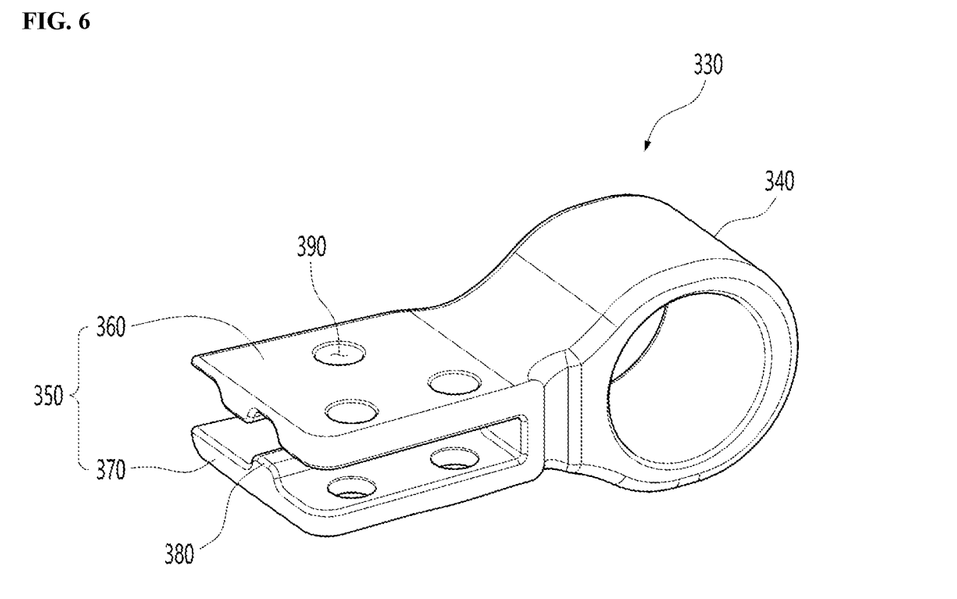
FIG. 6 exemplarily illustrates a structure of a mounting portion, which is formed separately from the body portion and is coupled to the body portion, in the suspension arm for a vehicle according to an example embodiment of the present disclosure.

According to an example embodiment of the present disclosure, as illustrated in FIGS. 3 and 6, the third mounting portion 330 may be configured to include a bushing coupling portion 340 formed on one side thereof and having a through-hole into through a bushing or the like may be mounted, and a fastening portion 350 formed to extend from the bushing coupling portion 340 in one direction so as to be used to couple the third mounting portion 330 to the body portion 200.

According to an example embodiment of the present disclosure, the bushing coupling portion 340 may be formed in a substantially ring-shaped structure with an open central portion. The fastening portion 350 may be formed in a substantially ⊏-shaped structure in which one or more coupling plates (for example, an upper plate 360 and a lower plate 370) are disposed at a predetermined interval.

According to an example embodiment of the present disclosure, the third mounting portion 330 may be configured to be coupled to the coupling portion 210 of the body portion 200 in surface-contact state via a coupling plate provided to the fastening portion 350. For example, according to an example embodiment of the present disclosure, the third mounting portion 330 may be configured such that the coupling portion 210 of the body portion 200 is inserted into a space defined between the upper plate 360 and the lower plate 370 which constitute the fastening portion 350, and the upper plate 360 and the lower plate 370 of the fastening portion 350 are coupled to an upper surface and a lower surface of the coupling portion 210 in surface-contact state.

According to an example embodiment of the present disclosure, the third mounting portion 330 may be configured such that the coupling portion 210 provided on one side of the body portion 200 is slidably moved and inserted between the upper plate 360 and the lower plate 370 of the fastening portion 350.

According to an example embodiment of the present disclosure, the third mounting portion 330 may be configured to be guided and slidably moved by slip prevention portions provided in the fastening portion 350 of the third mounting portion 330 and/or the coupling portion 210 of the body portion 200. This configuration may prevent an unintended slip (slip in a direction that intersects with the slidably moving direction) from occurring in the fastening portion 350 coupled to the coupling portion 210 by the slip prevention portions after the third mounting portion 330 is coupled to the coupling portion 210 of the body portion 200.

According to an example embodiment of the present disclosure, the slip prevention portions described above may be provided on one side or both sides of the fastening portion 350 of the third mounting portion 330 and the coupling portion 210 of the body portion 200. For example, in the example embodiments illustrated in the figures, a slip prevention portion 380 formed in the fastening portion 350 of the third mounting portion 330 and a slip prevention portion 220 formed in the coupling portion 210 of the body portion 200 interact with each other to prevent an unintended slip from occurring in the fastening portion 350 after the third mounting portion 300 is coupled to the body portion 200, while supporting the slidable movement and coupling between the fastening portion 350 and the coupling portion 210.

According to an example embodiment of the present disclosure, the slip prevention portions may be formed on surfaces of the fastening portion 350 of the third mounting portion 330 and the coupling portion 210 of the body portion 200, which face each other between the fastening portion 350 and the coupling portion 210. Each of the slip prevention portions may include a protrusion portion formed to extend along a sliding movement direction between the coupling portion 210 of the body portion 200 and the fastening portion 350 of the third mounting portion 330, a recess in which the protrusion portion is accommodated, and the like.

Figure 5:
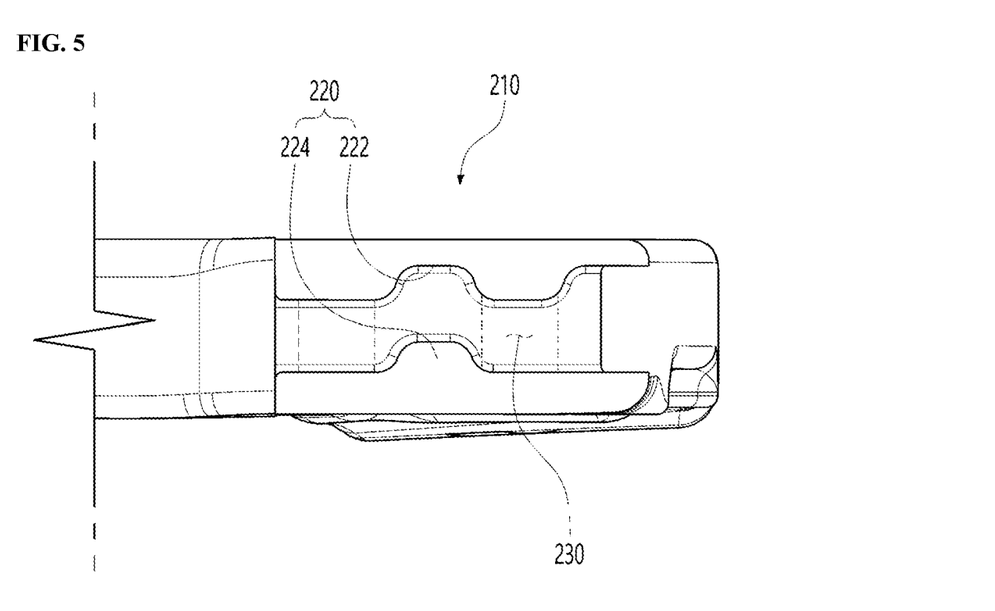
FIG. 5 exemplarily illustrates a structure of a coupling portion provided in the body portion of the suspension arm for a vehicle according to an example embodiment of the present disclosure.
Figure 7:
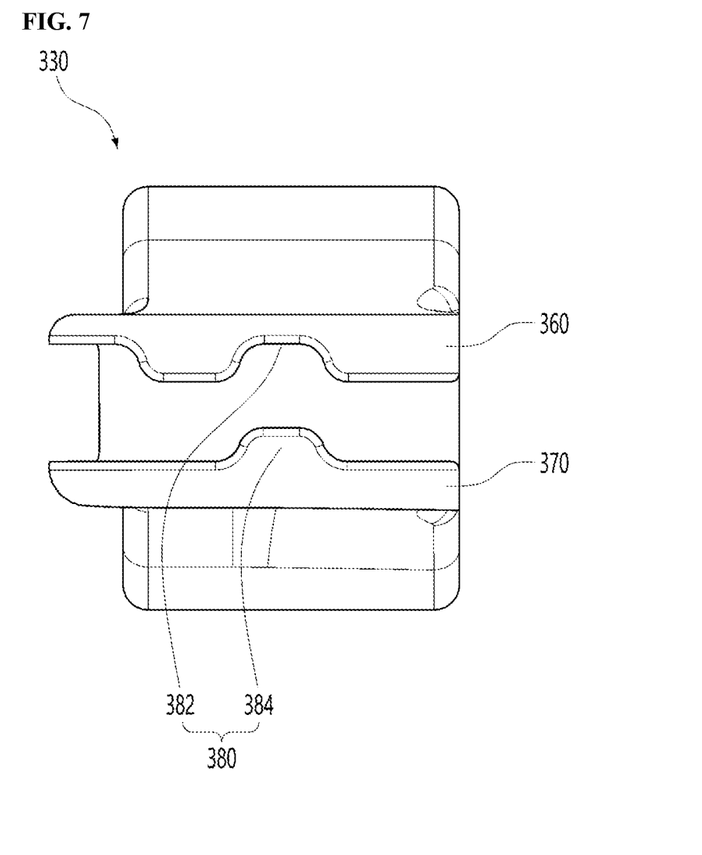
FIG. 7 exemplarily illustrates a state of the mounting portion illustrated in FIG. 6 when viewed from a front side.

For example, in the case of the example embodiments illustrated in the figures, a protrusion portion (an upper protrusion portion 222) is formed to protrude upward from an upper surface of the coupling portion 210, and a recess (an upper recess 382) depressed upward in a shape corresponding to the upper protrusion portion 222 is formed on a lower surface of the upper plate 360, which corresponds to the upper surface of the coupling portion 210. Thus, an upper slip prevention portion (a first slip prevention portion) is formed by coupling the upper protrusion portion 222 and the upper recess 382. Further, a protrusion portion (a lower protrusion portion 384) is formed to protrude upward from an upper surface of the lower plate 370, and a recess (a lower recess 224) depressed upward in a shape corresponding to the lower protrusion portion 384 is formed on a lower surface of the coupling portion 210, which corresponds to the upper surface of the lower plate 370. Thus, a lower slip prevention portion (a second slip prevention portion) is formed.

With this configuration, when the third mounting portion 330 is coupled to the body portion 200, the protrusion portion extending in one direction and the recess corresponding thereto are coupled to each other so that the fastening portion 350 of the third mounting portion 330 may be smoothly slidably moved and coupled to the coupling portion 210 of the body portion 200 while being guided along the extension direction of the slip prevention portion. After the coupling, a slip in a direction intersecting with the sliding movement direction is prevented by the coupling of the protrusion portion and the recess which correspond to each other. Thus, stable rigidity may be secured near the mounting portion.

According to an example embodiment of the present disclosure, as illustrated in FIGS. 5 and 7, the first slip prevention portion and the second slip prevention portion described above may be positioned so as to overlap each other in a direction perpendicular to the coupling plates (the upper plate and the lower plate) of the fastening portion 350 when viewed in a direction in which the fastening portion 350 is slidably coupled.

As described above, when the first slip prevention portion and the second slip prevention portion are formed at positions overlapping each other, as in the example embodiments illustrated in the figures, the coupling portion 210 of the body portion 200 on which the fastening portion 350 is mounted may be formed at an uniform thickness as a whole as illustrated in FIG. 5 even if the protrusion portion is formed on the upper surface of the coupling portion 210 and the recess is formed on the lower surface of the coupling portion 210. This makes it possible to further achieve a structural stability of the suspension arm.

However, the slip prevention portion of the suspension arm for a vehicle 100 according to an example embodiment of the present disclosure is not necessarily formed by being limited to the structures illustrated in the figures. The slip prevention portions may be formed in other various forms as long as it may perform a function of preventing a slip in a direction intersecting with the sliding movement direction while guiding the slidable movement of the fastening portion 350. For example, the slip prevention portion may be formed on one of upper and lower sides of the coupling portion. Alternatively, the slip prevention portion may be configured such that the protrusion portion and the recess are formed in directions opposite to those illustrated in the figures. Alternatively, all the protrusion portions may be formed in the coupling portion of the body portion unlike the structures illustrated in the figures.

According to an example embodiment of the present disclosure, one or more fastening members 400 may be further coupled to the fastening portion 350 of the third mounting portion 330 and the coupling portion 210 of the body portion 200 to enhance a fastening force between the third mounting portion 330 and the body portion 200. For example, in the case of the example embodiments illustrated in the figures, fastening holes 390 are formed in the upper plate 360 and the lower plate 370 of the third mounting portion 300, and through-holes 230 are formed at corresponding positions of the coupling portion 210 in shapes corresponding to the fastening holes 390, respectively. The fastening members 400 (for example, locking pins) are inserted into the fastening holes 390 and the through-holes 230, so that a fastening force between the third mounting portion 330 and the body portion 200 is enhanced.

According to an example embodiment of the present disclosure, the fastening members 400 may be rod-shaped locking pins, spring pins of a substantially C-shaped structure in which one side is cut out in an axial direction, or the like (see FIG. 3). The fastening members 400 may be mounted in a press-fitting manner in a direction substantially perpendicular to the fastening portion 350 of the third mounting portion 330 and the coupling portion 210 of the body portion 200 on which the fastening portion 350 is mounted. This supports the fastening between the third mounting portion 330 and the body portion 200.

Further, according to an example embodiment of the present disclosure, the body portion 200 of the suspension arm described above and the third mounting portion 330 (that is, the bushing coupling portion 340 and the fastening portion 350) that is coupled to the body portion 200, may be formed of different materials. For example, the body portion 200 may be formed of a first material including a light-weight carbon-based material such as a carbon fiber reinforced plastic (CFRP), and the third mounting portion 330 may be formed of a second material different from the first material (for example, a light-weight metallic material such as aluminum).

As described above, since the suspension arm for a vehicle 100 according to an example embodiment of the present disclosure is formed with the light-weight material, a weight of the suspension arm for a vehicle 100 may be reduced compared to a suspension arm for a vehicle in the related art. Further, since the coupling structure between the mounting portion and the body portion is improved, it is possible to stably secure a rigidity condition required for the suspension arm for a vehicle.

According to an example embodiment of the present disclosure, the suspension arm for a vehicle 100 according to the above-described example embodiments of the present disclosure may be formed in the following manner.

Figure 8:
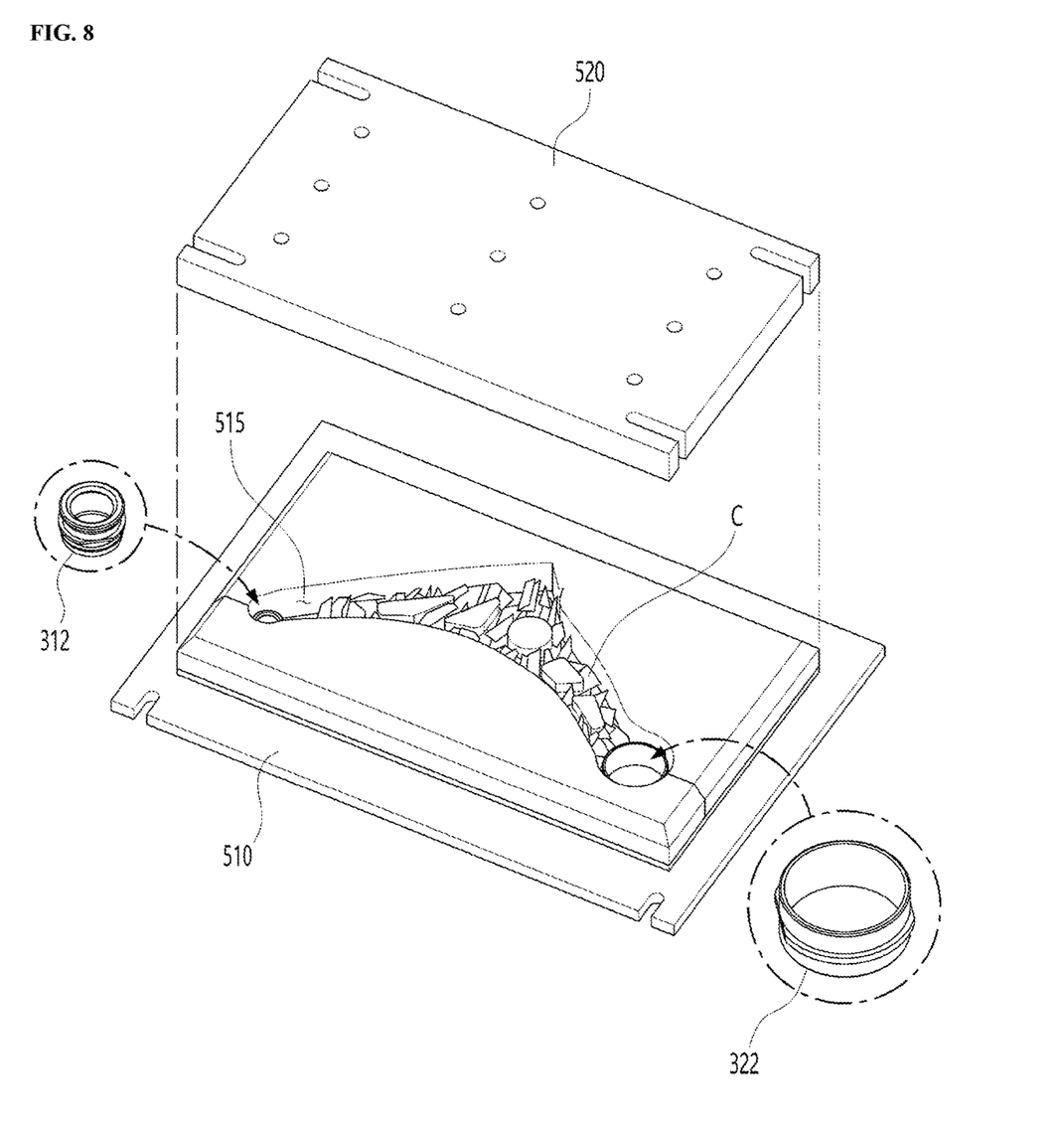
FIG. 8 schematically illustrates a state in which the suspension for the vehicle according to an example embodiment of the present disclosure is manufactured (for example, a state in which the body portion of the suspension arm is manufactured).

As illustrated in FIG. 8, the suspension arm for a vehicle 100 according to an example embodiment of the present disclosure may be formed by filling a light-weight carbon-based material into a mold provided with a recess having a shape corresponding to the suspension arm for a vehicle 100 and subsequently performing a hot-pressing on the material.

For example, the suspension arm for a vehicle 100 according to an example embodiment of the present disclosure may be formed by filling a light-weight carbon-based material (for example, a carbon chip C) or the like into a recess 515 formed in a lower mold 510 in a state in which the B-bushing 312 to be coupled to the first mounting portion 310, the G-bushing 322 to be coupled to the second mounting portion 320 and the like are inserted in the recess 515, and subsequently performing the hot-pressing on the material in a state in which the upper mold 520 presses against the lower mold 510 (however, the bushings may not be formed integrally with the body portion at the time of molding the body portion, and may be coupled to the body portion after forming the body portion).

With this process, the first mounting portion 310 and the second mounting portion 320 may be formed integrally with the body portion 200 by the light-weight carbon-based material. Further, the bushings or the like that are coupled to the first mounting portion 310 and the second mounting portion 320 may be formed integrally together with the body portion 200 when forming the body portion 200. This makes it possible to reduce the weight of the suspension arm for a vehicle and enhance the productivity of the suspension arm for a vehicle.

Subsequently, after the body portion is formed in the above-described manner, the third mounting portion 330 is formed with a light-weight metallic material such as aluminum, and then coupled to the coupling portion 210 formed on one side of the body portion 200. In this way, the suspension arm for a vehicle 100 according to an example embodiment of the present disclosure may be manufactured.

In this case, the coupling portion 210 of the body portion 200 may be configured to slidably move to and be inserted into the coupling portion 350 of the third mounting portion 330 as described above. A slip in a direction intersecting with the sliding movement direction may be prevented by the slip prevention portion. The fastening members 400 such as locking pins are fastened to the coupling portion 350 of the third mounting portion 330 and the coupling portion 210 of the body portion 200, which are coupled to each other. This stably supports the coupling of the third mounting portion 330 to the body portion 200.

In the meantime, in the above-described example embodiments, the suspension arm for a vehicle 100 according to an example embodiment of the present disclosure has been described by taking, as an example, the configuration in which the third mounting portion 330 to be coupled to the vehicle-body-side member is formed separately from the body portion 200 and is coupled to the body portion 200 through the coupling portion 210 formed in the body portion 200. However, the coupling structure between the body portion and the mounting portion described above may be also applied to the first mounting portion 310 or the second mounting portion 320 instead of or together with the third mounting portion 330.

That is, the suspension arm for a vehicle 100 according to an example embodiment of the present disclosure may be formed such that at least one of the plurality of mounting portions 310, 320 and 330 used to connect the suspension arm for a vehicle to the wheel-side member or the vehicle-body-side member has the above-described coupling structure.

Figure 9:
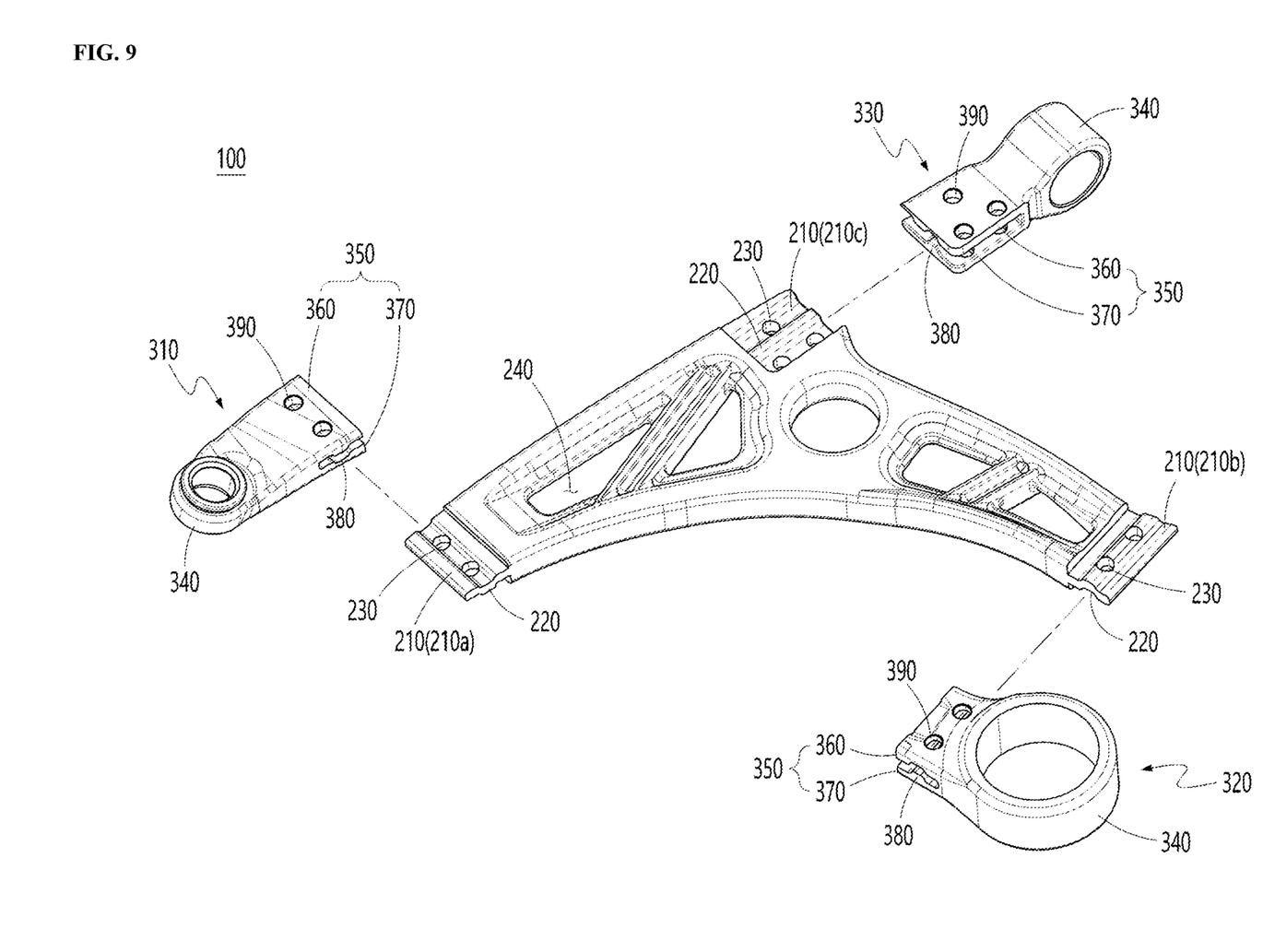
FIG. 9 exemplarily illustrates a structure of a suspension arm for a vehicle according to another example embodiment of the present disclosure (for the sake of convenience in description, fastening members will be omitted).

For example, referring to FIG. 9, an example embodiment is illustrated by way of example in which all of the plurality of mounting portions 310, 320 and 330 used to connect the suspension arm for a vehicle 100 to the wheel-side member or the vehicle-body-side member are formed in the same manner as the third mounting portion 330 in the above-described example embodiment.

That is, in the suspension arm for a vehicle 100 of the example embodiment illustrated in FIG. 9, all of the first mounting portion 310, the second mounting portion 320 and the third mounting portion 330 may be formed separately from the body portion 200, and subsequently, be coupled to the coupling portion 210 (210a, 210b and 210c) of the body portion 200. Each of the first mounting portion 310, the second mounting portion 320 and the third mounting portion 330 may be provided with a mounting portion 350 including the bushing coupling portion 340 and a coupling plate, and may be coupled to the coupling portion 210 of the body portion 200 in surface-contact state through the coupling plate. A slip prevention portion may be provided between the mounting portion 350 and the coupling portion 210.

In the example embodiment illustrated in FIG. 9, structures of the first mounting portion 310, the second mounting portion 320 and the third mounting portion 330, and the coupling portion 210 to which these mounting portions are coupled, may be formed in substantially the same or similar manner as those in the above-described example embodiments, and thus a detailed description thereof will be omitted.

In the example embodiment illustrated in FIG. 9, the third mounting portion 330 is configured such that the slip prevention portions provided in the fastening portion 350 and the coupling portion 210 are formed along a direction substantially parallel to the direction in which the fastening portion 350 extends from the bushing coupling portion 340 of the third mounting portion 330. In contrast, the slip prevention portions provided in the first mounting portion 310, the second mounting portion 320 and the coupling portion 210 to which the first mounting portion 310 and the second mounting portion 320 are coupled, are formed along a direction substantially perpendicular to a direction in which the fastening portion 350 extends from the bushing coupling portion 340. This point is a difference between the example embodiment illustrated in FIG. 9 and the above-described example embodiments.

In the example embodiment illustrated in FIG. 9, the structure of the slip prevention portion is formed as described above in consideration of a direction of the load mainly applied to the vicinity of the mounting portion, but the formation direction and structure of the slip prevention portions may be appropriately changed by those skilled in the art according to specific design conditions of the suspension arm.

Although the present disclosure has been described above in terms of specific items such as detailed constituent elements as well as the limited example embodiments, they are merely provided to help more general understanding of the present disclosure, and the present disclosure is not limited to the above example embodiments. Various modifications and changes could have been realized by those skilled in the art to which the present disclosure pertains from the above description.

Therefore, the spirit of the present disclosure need not to be limited to the above-described example embodiments, and in addition to the appended claims to be described below, and all ranges equivalent to or changed from these claims need to be said to belong to the scope and spirit of the present disclosure.

What is claimed is:

1. A suspension arm for a vehicle used in a suspension device of a vehicle, the suspension arm comprising:
    a body portion constituting a basic body of the suspension arm; and
    a plurality of mounting portions configured to connect the suspension arm to a wheel-side member or a vehicle-body-side member, wherein the plurality of mounting portions include a first mounting portion configured to connect the suspension arm to the wheel-side member, a second mounting portion configured to connect the suspension arm to the vehicle-body-side member, and a third mounting portion, an A-bushing is coupled to the third mounting portion, the third mounting portion includes a bushing coupling portion on which the A-bushing is mounted, and a fastening portion formed to extend from the bushing coupling portion in one direction, the third mounting portion is configured such that the fastening portion is configured to be coupled to a coupling portion formed on one side of the body portion in surface-contact state, the fastening portion of the third mounting portion includes coupling plates including an upper plate and a lower plate disposed to be spaced apart from each other, the coupling portion of the body portion is coupled between the upper plate and the lower plate of the fastening portion, a slip prevention portion configured to prevent a slip of the third mounting portion coupled to the body portion is provided between the fastening portion of the third mounting portion and the coupling portion of the body portion, the third mounting portion is configured to slidably move in a direction in which the fastening portion extends from the bushing coupling portion and be coupled to the coupling portion of the body portion, and the slip prevention portion includes a protrusion portion formed to extend along the direction in which the fastening portion extends from the bushing coupling portion and a recess in which the protrusion portion is accommodated such that the third mounting portion is prevented from slipping in a direction perpendicular to the direction in which the fastening portion extends from the bushing coupling portion when the third mounting portion is coupled to the body portion.

2. The suspension arm for a vehicle of claim 1, wherein the slip prevention portion includes:

a first slip prevention portion provided with an upper protrusion portion formed to protrude upward from an upper surface of the connecting portion, and an upper recess formed in a lower surface of the upper plate and formed to be depressed into a shape corresponding to the upper protrusion portion; and a second slip prevention portion provided with a lower protrusion portion formed to protrude upward from an upper face of the lower plate, and a lower recess formed in a lower face of the coupling portion and formed to be depressed into a shape corresponding to the lower protrusion portion.

3. The suspension arm for a vehicle of claim 2, wherein the first slip prevention portion and the second slip prevention portion are configured to be positioned to overlap each other in a direction perpendicular to the coupling plate of the fastening portion.

4. The suspension arm for a vehicle of claim 1, wherein the suspension arm further comprises a fastening member formed to penetrate and be inserted into the fastening portion and the coupling portion.

5. The suspension arm for a vehicle of claim 4, wherein the fastening member is configured with a locking pin that is inserted in the direction perpendicular to the coupling plate of the fastening portion.

6. The suspension arm for a vehicle of claim 5, wherein the locking pin is a spring-pin.

7. The suspension arm for a vehicle of claim 1, wherein the body portion is formed of a first material, wherein the plurality of mounting portions including the bushing coupling portion and the fastening portion are formed of a second material, and wherein the first material and the second material are different from each other.

8. The suspension arm for a vehicle of claim 7, wherein the first material is a carbon-based material, and the second material is a metallic material.

9. The suspension arm for a vehicle of claim 8, wherein the first material is a carbon fiber reinforced plastic, and the second material is aluminum.

* * * * *